INVENTOR
Heinz Leiber

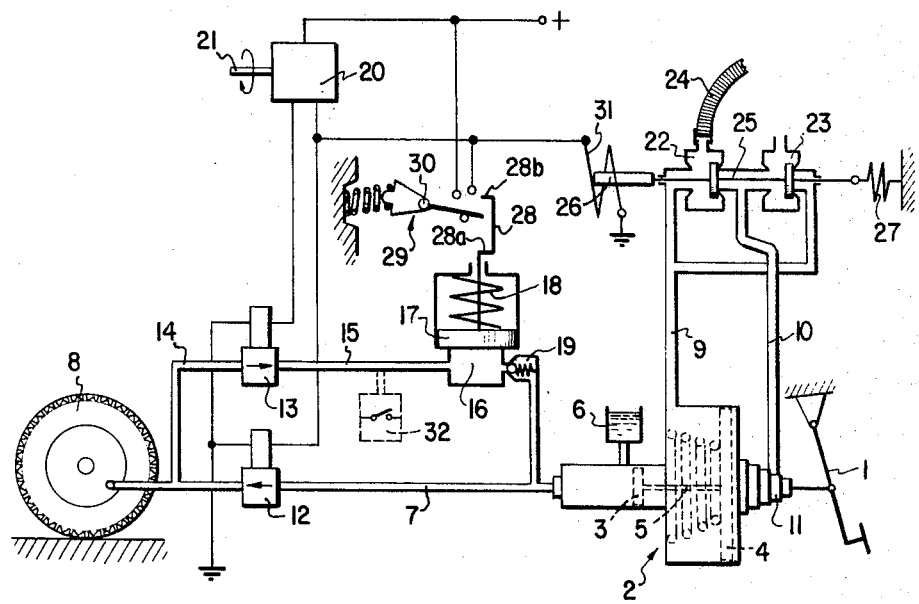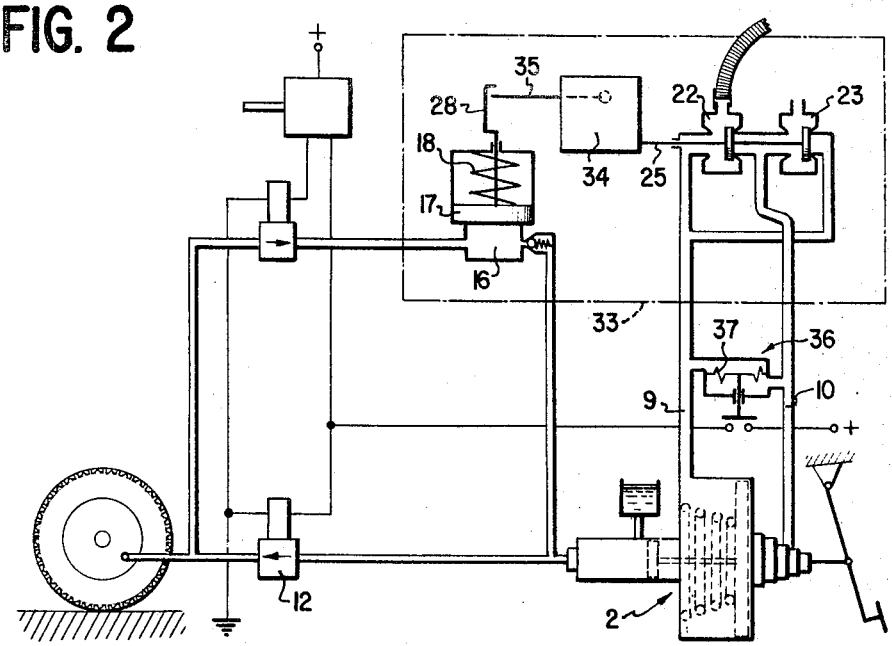

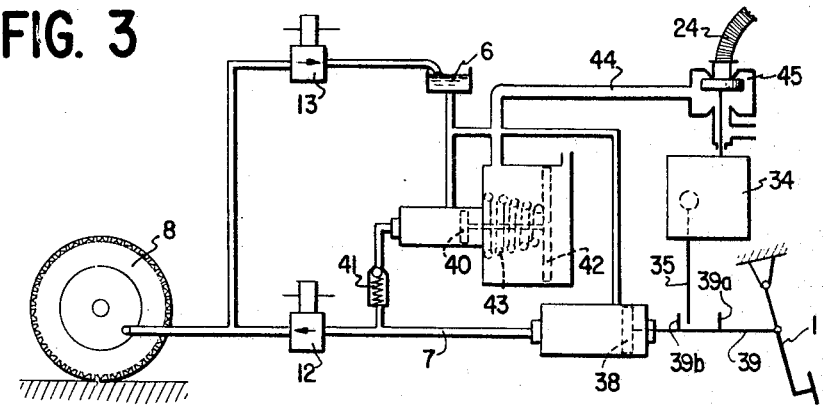
FIG. 3
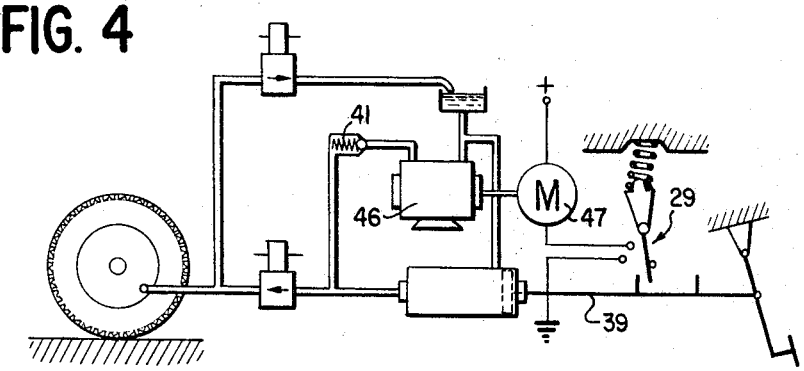
FIG. 4
FIG. 4a
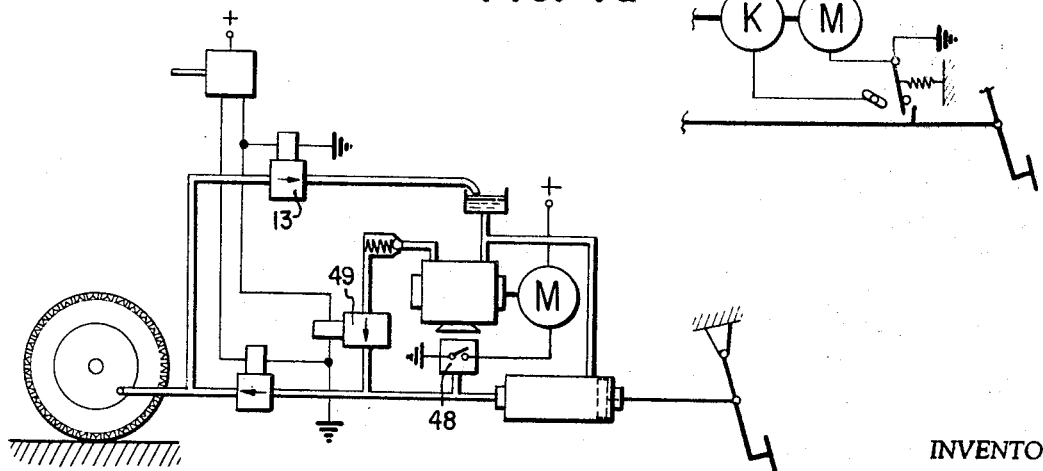
FIG. 5
INVENTOR
Heinz Leiber
BY *Spencer & Kaye*
ATTORNEYS.

BY Spencer & Kaye

ATTORNEYS.

United States Patent Office 3,521,934
Patented July 28, 1970

3,521,934
APPARATUS FOR PREVENTING LOSS OF BRAKING FORCE IN A HYDRAULIC BRAKE SYSTEM HAVING A BRAKE CONTROL SYSTEM FOR PREVENTING WHEEL LOCKING
Heinz Leiber, Leimen, Germany, assignor to Teldix Gesellschaft mit beschrankter Haftung, Heidelberg, Germany
Filed Apr. 8, 1968, Ser. No. 719,446
Claims priority, application Germany, Apr. 8, 1967, T 33,620
Int. Cl. B60t 17/18
U.S. Cl. 303—21                                36 Claims

ABSTRACT OF THE DISCLOSURE

Apparatus for preventing loss of braking force in a hydraulic brake system having a brake control system for preventing wheel locking which temporarily reduces the braking force by drawing brake fluid from the brake fluid pressure system. The apparatus includes means for sensing the amount of brake fluid in the brake pressure system and means responsive thereto for automatically refilling the pressure system with brake fluid in dependence on that amount.

CROSS-REFERENCE TO RELATED APPLICATION

The subject matter of this application is related to that disclosed in copending application Ser. No. 686,492, filed Nov. 29, 1967, of Heinz Leiber.

BACKGROUND OF THE INVENTION

The present invention relates to a piston actuated hydraulic vehicle brake system which has a control system for preventing vehicle wheel locking that temporarily reduces the braking force applied to the wheel or wheels by drawing brake fluid from the brake fluid pressure system that feeds the wheel brake cylinders through a system of hydraulic brake lines. This type of control system is described in the copending application referred to above.

The term "piston actuated" as used in this specification is intended to include all brake systems having either a master brake pressure cylinder or a brake force booster with a secondary brake pressure cylinder. These brake systems, in contrast to the so-called "pump brakes" which have the brake medium in continuous circulation, admit of the difficulty that, after a limited number of control cycles, which drop the pressure to prevent a wheel or wheels from locking, an amount of brake fluid equal to the entire piston displacement of the brake pressure piston will be drained off preventing the piston from further producing hydraulic brake pressure.

It is always possible to replenish the brake fluid in the brake fluid pressure system by allowing the brake pedal momentarily to move back to its initial or normal position. The refilling of the brake pressure cylinder and consequent restoration of the braking force should not be made dependent on the ability of the vehicle driver to "pump" the brakes in this way, however, since the fright alone which the driver may receive due to the sudden loss of braking force may make him incapable of reacting with sufficient legerity.

SUMMARY OF THE INVENTION

An object of the present invention, therefore, is to provide apparatus for preventing the loss of braking force in a hydraulic brake system that has a control system for preventing wheel locking which temporarily reduces the braking force by drawing brake fluid from the brake fluid pressure system.

This as well as other objects which will become apparent in the discussion that follows is achieved, according to the present invention, by providing means for sensing the amount of brake fluid in the pressure system and means, responsive to the sensing means, for automatically refilling the brake fluid in the pressure system during the controlled braking process in dependence upon that sensed amount of fluid.

The means for sensing the amount of brake fluid in the brake pressure system to define its fluid requirements can be constructed in a large number of different ways. Basically, the sensing can be accomplished either by measuring the amount of fluid drained from the brake pressure system (outflow measurement) or measuring the amount of fluid remaining (residual quantity measurement). More will be said about these two approaches in the description that follows. The best way to realize the invention usually depends upon the type of brake system and control system employed.

If the brake system has a pneumatically activated brake force booster and the control system for prevening wheel locking has separately controlled inlet and outlet valves as well as a so-called "storage chamber" for transient storage of the brake fluid which has been drained off from the brake pressure system, one wall of the storage chamber being capable of moving outward against the force of a spring to expand the capacity of the chamber, then the present invention can be realized by interchanging the pneumatic line connections to both chambers of the pneumatic cylinder of the brake force booster in dependence upon the amount of fluid in the storage chamber while simultaneously closing the inlet valve. This interchange causes a reversal of pneumatic pressures on the two sides of the brake force booster piston and a deactivation of the driver actuated brake force booster control valve. As a result, the secondary hydraulic piston will be forced to move backward and draw fluid from, and thereby empty, the storage chamber. Because the inlet valve is kept closed during this procedure, the loss of pressure in the brake fluid pressure system caused by the backward movement of the secondary piston will not affect the braking force.

It is proposed according to a particular embodiment of the present invention that this as well as other refilling apparatus which will be described in further detail below be provided with a "snap-action mechanism" arranged to switch at least one auxiliary pressure control valve. This snap-action mechanism may be actuated by a movable mechanical brake element the position of which depends upon the amount of brake fluid in the brake pressure system so that the auxiliary valve will be switched into one position when the amount of brake fluid falls below a prescribed minimum value and switched to another when the amount of fluid exceeds a prescribed desired value. In the apparatus described above the auxiliary valve may thus be connected to interchange the pressure lines to both chambers of the pneumatic brake force booster.

The term "brake fluid pressure system," as used in this specification is intended to include the brake system master or secondary brake pressure cylinder as well as the portion of the main pressure line with all its various branches which interconnects the pressure cylinder and the various wheel brake cylinder inlet valves that form a part of and are actuated by the control system for preventing wheel locking. The "movable mechanical brake element" can, according to the first mentioned method of measuring the amount of fluid in the brake pressure system by its outflow, be the movable storage chamber wall. Likewise, according to the method of measuring directly the amount of brake fluid remaining in the brake pressure system, the movable brake element can also be the master brake pressure piston itself or a part of the mechanical linkage connected to drive the master piston such as a brake lever or the like. One of any of these parts which directly measure by position the amount of fluid remaining in the brake pressure system will hereafter be referred to as the "brake element which moves in response to the position of the master brake piston."

In the refilling apparatus for the brake system having the pneumatically actuated brake force booster mentioned above, two mechanically interconnected three-way valves may be provided, according to a particular feature of the present invention, to interchange the two booster chamber pressure lines. These three-way valves may be coupled to a snap-action mechanism which, in turn, is responsive to and actuated by the movable storage chamber wall. The snap-action mechanism then can thus be made operative to initiate the reverse movement of the secondary piston just before the storage chamber becomes completely filled. Thereafter, shortly before the storage chamber is completely emptied, the storage chamber wall may again cause the snap-action mechanism to switch the two three-way valves back to their normal position to terminate the refilling procedure. A pressure-difference actuated electrical switch arranged between the two chambers of the brake force booster and electrically connected to provide excitation to the solenoid of the normally open inlet valve of the brake control system is provided to detect the reversal of pneumatic pressure and hold the inlet valve closed during the refilling procedure.

According to an especially advantageous embodiment of the present invention, the three-way valves may be electromagnetically actuated by an electric snap switch, toggle switch or the like. Like the snap-action mechanism, the snap switch is made to actuate at the end points of the path of motion of the "movable brake element" (e.g., the movable storage chamber wall), the position of which is dependent upon the amount of brake fluid remaining in the brake pressure system. The snap switch is also electrically connected in such a way that, as a matter of first priority, the inlet valve will be closed whenever the pneumatic pressure lines of the brake force booster are interchanged. This arrangement, therefore, requires no pressure-difference switch.

Further possibilities for realizing the apparatus according to the present invention are based on the use of a refill pump as such. According to one preferred embodiment of the invention, the pump draws brake fluid from a brake system supply container and forces it into the brake fluid pressure system.

The pump employed for refilling the brake fluid pressure system may be driven by an electric motor which may be quickly started and stopped, by an electromagnetically actuated oscillating drive mechanism, or by a continuously running rotating drive connected to the pump by an electromagnetically actuated clutch. It is possible also to allow the refill pump to run continuously, at least during the time that the brakes are applied, but to build an electromagnetically actuated shut-off valve into the discharge line of the pump.

Either the pump drive or the pump shut-off valve can be controlled by an electric switch the on or off position of which is made dependent upon the position of the brake element which moves in response to the position of the master brake piston. A snap switch which operates in the manner described above may be used for this purpose. It is also possible, to employ the electric switch which turns itself on whenever the amount of brake fluid in the brake pressure system falls below a certain desired value. In this case it is only necessary that the brake element have a single switching position.

Since, roughly speaking, the same amount of brake fluid always flows out of the outlet valve per unit time when this outlet valve is opened it is also possible to make the refill pump operate in direct dependence upon the operation of the outlet valve; it is possible, in particular, to allow the pump to insert brake fluid into the high pressure system when the outlet valve is open and to stop the pump or close the shut-off valve at the discharge line of the pump when the outlet valve is closed. If this is done, the amount of fluid delivered by this pump to the high pressure system per unit time should be made approximately equal to the amount which flows out of the outlet valve.

In accordance with another preferred embodiment of the present invention the refill pump may be made to draw fluid from a storage chamber, of the type described above, designed to temporarily store the brake fluid drawn from the pressure system by the brake control system. The storage chamber may be connected to empty itself into the brake fluid pressure line exclusively through the refill pump or via a reverse check valve interconnecting the storage chamber and the brake fluid pressure line parallel to the pump. In the latter case the storage chamber can empty itself directly into the line after the brake force is removed and the line pressure has dropped. The pump can, in this embodiment, again be controlled by means of the pump drive or by a shut-off valve inserted in the pump outlet line. In particular, the pump may be electrically controlled by an electrical switch of the type described above. In contrast to the apparatus used for throwing the switch when the pump is arranged to draw fluid from a supply container, however, the switch may here be actuated by the movable storage chamber wall.

It is further proposed according to another preferred embodiment of the present invention that an aperiodically operating piston pump be used as the refill pump. Its displacement can be made large so that its piston must only move as the occasion demands. Since, in such a case, large forces are required to move the piston, this piston may be rigidly coupled with an auxiliary piston driven by vacuum, air pressure, lubricating oil pressure or by the pressure generated by some other fluid pump on the vehicle such as its power steering pump or the like. The amount of pressure medium which is allowed to act on the auxiliary piston may be controlled in dependence upon the amount of brake fluid in the brake fluid pressure system.

According to a particular feature of the present invention, this auxiliary piston embodiment may be constructed so that the brake fluid content of the brake fluid pressure system will be held at a constant level. As will be described in greater detail below in the description of one of the preferred embodiments of the invention, a special valve arrangement is provided in this case to insure that the position of the refill piston is dependent, in approximately direct proportion, upon the position of the movable wall of a storage chamber. This embodiment has the advantage that it permits only a small amount of brake pedal travel and that it refills the brake pressure system without causing any detectable movement or vibration of the brake pedal.

A solenoid actuated suction pump arranged to draw from a storage chamber is also especially suitable as an aperiodically operating refill pump. The piston of this pump must be provided with a spring which is strong enough to drive the piston toward the end of its cylinder against the force of the brake fluid pressure; i.e., to actuate the piston in its pumping direction. To excite the pump solenoid, which draws the piston back against the force of the spring, two limit switches may be provided and connected electrically in series with each other, with a source of electrical power and with the solenoid. One of the switches should be made normally open, constructed, if possible, with a certain amount of dead stroke, and actuated by the movable wall of the storage chamber. The other switch should be made normally closed and arranged to be opened by the piston or piston rod after the piston has been pulled by the pump solenoid against the force of the spring to the end of its stroke.

Other embodiments of the present invention are designed to simplify the construction of the refilling apparatus and reduce the number of electrical switches employed. If the suction pump mentioned above is used and arranged, as is described, to draw fluid from the storage chamber, one such electrical switch can be eliminated by providing a switch chamber in the line between the storage chamber and the pump so that, when the wall of the chamber, which—like the storage chamber—may be moved outward against the force of a spring, moves a certain short stroke distance and actuates a switch, it provides excitation current to the solenoid of the pump. A restriction in the line between the storage chamber and the switch chamber acts to slowly transfer the brake fluid in the storage chamber to the switch chamber. The spring forces against, and the surface areas of, the movable walls of both chambers are chosen so that the pressure generated in the storage chamber is alone sufficient to deflect the movable wall of the switch chamber to actuate the electrical switch and turn on the solenoid. The displacement of the refill pump piston is made to correspond approximately to the volume of the switch chamber but to constitute only a fraction of the displacement of the storage chamber. This design achieves, basically, another periodically operating piston pump the periodic manner of operation of which is effected by hydraulic means. In particular, this pump does not operate in response to an electrical turn-on signal, but in response to the presence of a certain pressure in the storage chamber; that is, whenever the storage chamber is at least partially filled.

A special advantage of this embodiment lies in the fact that the pump can be made extremely small, and, as a consequence, may be combined with the storage chamber and the switch chamber and even, when possible, with the valves of the control system for preventing wheel locking into a single unit of construction.

Instead of the suction pump, apparatus which realizes the present invention may also include a so-called pressure pump; that is, a pump which is driven by a solenoid in the pumping direction. Apparatus employing this type of pump also lends itself to simple construction and operational reliability.

Apparatus according to a still further preferred embodiment of the present invention employs a pressure pump, the piston of which excites and deexcites the pump's own solenoid with the aid of a toggle switch, at both ends of its stroke. This type of self-activating piston pump is switched on by the movable wall of the storage chamber as soon as the amount of fluid in the storage chamber attains or exceeds a certain minimum value.

A considerable simplification of this embodiment is also possible, according to the present invention, with the provision of actuating means which can move only against a relatively large amount of friction, and which is caused to follow the movement of the piston near both ends of the piston's stroke. This actuating means actuates a simple normally open contact switch which has a certain amount of dead stroke. A further electrical switch, actuated by the movable wall of the storage chamber as in the embodiment described above, can be eliminated if so much room is left between the actuating means and the contact switch that the switch is not actuated unless another force transfer member, such as a flat wedge, is inserted therebetween. The insertion of this transfer member may thus be controlled by the storage chamber wall.

BRIEF DESCRIPTION OF THE DRAWINGS

In all of the figures of the drawings the single thin lines represent electrical conductors, the single heavy lines present either mechanical linkage or electrical switch contacts, the narrowly spaced double lines represent hydraulic lines and the double lines spaced a greater distance apart represent pneumatic tubing.

FIG. 1 is a schematic diagram of refilling apparatus, according to the present invention, employed in a brake system having a brake force booster. The pneumatic lines of the brake force booster are provided with electromagnetically activated valves for selectively interchanging the lines.

FIG. 2 is a schematic diagram of refilling apparatus, according to the present invention, similar to the apparatus of FIG. 1 and provided with pneumatic line interchanging valves which are mechanically actuated by a snap-action mechanism.

FIG. 3 is a schematic diagram of a brake system having a pedal actuated master brake pressure piston, and refill apparatus, according to the present invention having a refill piston driven by an auxiliary pneumatic piston.

FIG. 4 is a schematic diagram of a brake system similar to the system of FIG. 3 having a refill pump operated by an electric motor.

FIG. 4a is a schematic diagram of a variation on the refilling apparatus of FIG. 4 employing an electrically activated quick-coupling refill pump drive.

FIG. 5 is a schematic diagram of a brake system similar to the system of FIG. 4 having a pump shut-off valve which is controlled synchronously with an outlet valve of the control system for preventing wheel locking.

DESCRIPTION OF THE PREFERRED EMBODIMENTS

Figure 6:
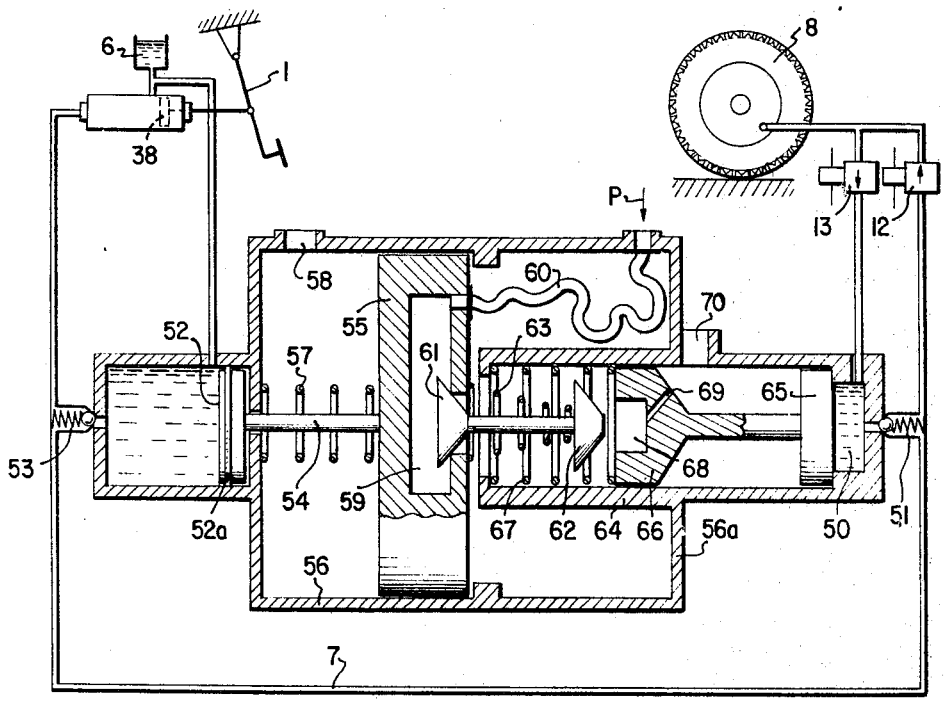
FIG. 6 is a schematic diagram of a brake system having a pedal actuated master brake pressure piston and refill apparatus, according to the present invention, with a refill piston which slowly actuates in dependence upon the amount of fluid in a storage chamber.

Referring now to the drawings there is shown, in FIG. 1, a brake system, having a brake pedal 1 and a pneumatic brake force booster 2 directly controlled thereby. This kind of brake force booster is produced, for example, as brake device Type T51 by the firm Alfred Teves KG of Frankfurt, Germany. This device contains a secondary brake pressure piston 3, a flexible sleeve which acts as a pneumatic valve and a vacuum piston 4, rigidly coupled to the piston 3 by a piston rod 5 and biased toward the right by a return spring surrounding the rod 5. Above the secondary brake pressure cylinder which applies force to the wheel brakes through a hydraulic line 7 sits a brake fluid supply container 6. The wheel brakes and the wheel brake cylinder, not shown, are mounted on the brake end cover of a vehicle wheel 8. The brake force booster is installed in the usual fashion such that the connecting line 9, attached to the chamber to the left of the pneumatic piston, connects with the air intake of the motor. The connecting line 10, which leads to the control valve built into the rubber sleeve 11 and, in turn, to the right side of the pneumatic piston, permits entrance of the outside air.

The control system for preventing wheel locking which is provided in this brake system includes an electromagnetical inlet valve 12 installed on the main pressure line 7 and a similar outlet valve 13 which normally closes off the wheel brake cylinder outlet line 14. If the normally closed outlet valve is opened, brake fluid is allowed to pass through a line 15 to a storage chamber 16 where is presses against a piston 17 that forms one wall of this chamber and pushes it upward against the force of the spring 18. The storage chamber 16 is also connected via a one-way valve or "check valve" 19 to the main pressure line 7.

The drive shaft 21 of an electrical sender which is responsive to the condition of motion of the shaft is driven by the wheel 8. The sender 20 controls both the inlet valve 12 and the outlet valve 13 in dependence upon the rotational accelerations and/or decelerations of the shaft 21 to obtain a constant amount of slippage between the wheel 8 and the road when the vehicle is braked. Such a control system for preventing wheel locking has previously been proposed in the related application referred to at the beginning of this specification. In this embodiment and in the embodiment illustrated in FIG. 2 it is important that both the inlet and outlet valves be separately, individually, controlled. In the remaining embodiments of the present invention illustrated in FIGS. 3 through 10 the control system for preventing wheel locking is of this same basic type; however, these embodiments may also be employed with a prior art control system which controls the inlet and outlet valves in a reciprocal manner; that is, a control system which requires that the inlet valve be opened when the outlet valve is closed and vice versa.

Two three-way valves 22 and 23 are provided in the apparatus according to the invention as shown in FIG. 1. In the valve position illustrated, the upper valve inlets are connected with the left valve outlets; the right valve outlets are closed off by means of the plate-shaped valve elements. A pneumatic hose line 24 connects the upper inlet of the valve 22 with the air intake of the vehicle motor; the upper inlet of the three-way valve 23 opens to the outside air and is therefore at atmospheric pressure. The two valve elements are interconnected by a valve rod 25 which projects out of the valve housings both to the right and to the left. The left end of the rod carries an armature 26 while the right end is connected to a pulling spring 27. The two valves are simultaneously actuated by a solenoid 31 which is electrically connected to a source of power via a toggle or snap switch 29. The switch 29, which rotates about an axis 30 is actuated by a doubly bent switching rod 28 carried by the storage chamber piston.

The operation of the apparatus schematically illustrated in FIG. 1 will now be described. It is assumed that the driver of the vehicle has braked the vehicle and that the control system for preventing wheel locking has been operative for a time sufficiently long to cause the storage chamber 16 to fill up with brake fluid and the secondary piston 3 to approach a position near the end of its stroke at which end it would no longer be able to produce further brake pressure. At this time the storage chamber piston 17 has raised far enough to allow the bent-over portion 28a of the switching rod 28 to snap the toggle switch to its upward position. When this happens the source of electrical power designated with the plus sign is simultaneously connected to the inlet valve 12 and to a valve solenoid 31 positioned near the armature 26. The inlet valve closes and the armature 26 is drawn toward the left. The two valves 22 and 23 are switched over so that the vacuum inlet is connected with line 10 and the outside air allowed to enter line 9. As a result, the twin pistons 3 and 4 are moved toward the right independently of the position of the pedal-operated brake control valve. The brake pressure in line 7 therefore drops; however, this drop in pressure will have no effect on the braking force applied to the wheel 8 because the inlet valve 12 is closed. The storage chamber 16 will then empty itself through the check valve 19 with the aid of the spring-biassed piston 17. The piston rod 28 will move down sufficiently far so that the bent-over portion 28b will flip the toggle switch 29 downward to its initial position allowing the three-way valves 22 and 23 to switch back to their normal position and causing the brake force booster to function as before. The inlet valve 12 is consequently also disconnected from the source of electrical power and subjected again to the exclusive control of the rotational speed-responsive sender 20.

The operational safety of the apparatus according to the present invention is further increased by providing the line 15 with a pressure switch which actuates the starter of the vehicle motor when the storage chamber 16 is completely filled and the pressure rises above normal. This condition normally cannot occur but is possible when the vehicle is braked on a hill with the motor turned off or when the motor stalls during a panic stop. When this happens there is insufficient vacuum to cause the quick return movement of the twin piston of the brake force booster.

The embodiment shown in FIG. 2 differs from that shown in FIG. 1 in that the unit 33 outlined by the dotted-dashed line is purely mechanical in operation. This unit contains the two three-way valves 22 and 23, the storage chamber 16 and a snap-action mechanism 34 for actuating the three-way valves. Like the toggle switch 29 of FIG. 1 the switching lever 35 on the snap-action mechanism is moved by the bent switching rod 28 of the storage chamber piston 17. The piston 17 can generate considerable actuating force if its diameter and its spring 18 are suitably dimensioned. The snap-action mechanism operates in such a way that upward movement of the lever 35 will move the valve rod 25 of the three-way valves suddenly toward the left and the downward movement of the lever 35 will cause the valve rod to fall back to the position illustrated.

A pressure-difference switch 36 is connected between the pneumatic lines 9 and 10. Its function is to hold the inlet valve 12 closed while the polarity of the pneumatic lines of the brake force booster 2 is reversed. The pressure difference switch 36 includes a diaphragm 37 which closes an electrical contact if it is forced downward. The electrical contact, when closed, connects the inlet valve 12 to a source of electrical power. The region above the diaphragm 37 is connected with the pneumatic line 9 and the region below with the line 10. The pressure-difference switch closes, therefore, when there is a vacuum in line 10.

FIG. 3 illustrates another embodiment of the present invention applied to a simple brake system the brake pressure of which is generated by a master brake pressure piston 38 arranged to move inside a master brake cylinder in response to force applied to the brake pedal 1. The master brake cylinder is connected via a main brake pressure line 7 and the inlet valve 12 of the control system for preventing wheel locking to the wheel brake cylinder of the vehicle wheel 8. The outlet line with the outlet valve 13 of the control system for preventing wheel locking terminates in the brake fluid supply container 6.

The position of the master brake pressure piston rod 39 serves, in this case, to determine the amount of brake fluid remaining in the brake pressure system while the vehicle is being braked. Instead of directly forcing the master brake pressure piston back to its initial position, however, as in the apparatus of FIGS. 1 and 2, the brake fluid is conveyed from its supply container 6 into the main pressure line 7 by means of a refill piston 40. The refill piston 40 and its cylinder are constructed in a manner similar to the master brake pressure piston and cylinder; that is, the piston is provided with a packing ring and works as a pump. A check valve 41 is provided in the line between the refill cylinder and the main brake pressure line 7 to prevent the pressure in the line 7 from escaping during braking to the refill cylinder.

The refill piston 40 is rigidly connected to a pneumatic auxiliary piston 42 so as to form a twin piston of the type employed in a pneumatic brake force booster. A return spring 43 is provided to bias the twin piston to its normal position toward the right. The chamber to the left of the auxiliary piston 42 is connected to a three-way valve 45 via an air line 44. The valve 45 connects the air line to the outside atmosphere when in its normal position, as shown, or, when switched, to a source of vacuum, via a vacuum hose line 24. The chamber to the right of the pneumatic piston 42 always remains at atmospheric pressure.

A snap-action mechanism 34 of the type described above in connection with FIG. 2 controls the position of the three-way valve 45. Its switching lever 35 will be moved toward the left by the catch 39a on the piston rod 39 when the master brake pressure piston 38 reaches a certain safety distance from the left end of the master brake cylinder. If this happens the snap-action mechanism will switch over the three-way valve causing the pressure in line 44 to drop. The twin piston 42 and 40 will then move toward the left and force the contents of the refill cylinder through the check valve 41 into the main brake pressure line. The master brake pressure piston 38 will then be driven toward the right until a second catch 39b on its piston rod 39 returns the switching lever 35 of the snap-action mechanism to its initial position. If this refill process causes an increase in pressure in the main brake pressure line the control system for preventing wheel locking will automatically act to close the inlet valve 12.

FIG. 4 is directed to a brake system of the type shown in FIG. 3. Here too the amount of brake fluid in the brake pressure system is measured by the position of the master brake pressure piston rod 39. A rotary refill pump 46 driven by an electric motor 47 serves in this case in place of the vacuum-operated twin piston system of FIG. 3. This pump 46 draws brake fluid from the supply container 6 and conveys it through the reverse check valve 41 to the main pressure line. The motor 47 is switched on by a toggle switch of the type shown in FIG. 1 before the master brake pressure piston reaches the left end of the master brake cylinder and is switched off when the master brake pressure piston has moved sufficiently toward the right. Two catches or stops on the piston rod 39 are provided to actuate the switch in the manner described in connection with FIG. 3.

FIG. 4a shows a variation of the refill pump drive and switching mechanism which can be used in place of the direct motor drive and toggle switch of FIG. 4. The pump drive includes an electric motor M which is arranged to run continuously, at least during the braking procedure, and an electrically controlled quick-coupling K. The coupling may comprise a magnetic clutch or any other suitable device known in the art which mechanically connects two shafts in response to an electric current. The clutch is connected between a source of electrical power and ground via a single pole, single throw switch that is mechanically biassed in the open position and mechanically closed by a single catch or stop on the master brake pressure piston rod.

The embodiment shown in FIG. 5 is similar to that shown in FIG. 4. Here, however, the motor is switched on by means of a pressure switch 48 connected to the main brake pressure line so long as there is a certain minimum amount of brake pressure. The brake pressure switch functions approximately in the manner of the familiar brake light switch, commonly used on automobiles. An electromagnetically actuated fluid valve 49 is provided in the line between the pump and the main brake pressure line so that fluid is not continuously conveyed by the pump into this line. This valve 49 is connected electrically in parallel with the outlet valve 13 and is synchronously switched therewith by the sending means of the control system for preventing wheel locking which senses the condition of rotational motion of the wheel. The capacity of the pump or the cross-sectional area of the fluid lines is chosen so that the time average of the fluid refilled is at least roughly the same as that which flows out of the outlet valve 13. This arrangement thus maintains a volume balance within the brake system and effectively prevents the master brake pressure piston from ever reaching the left end of the master brake cylinder and causing a drop in brake pressure.

The refill apparatus of FIG. 6 is effective to continuously refill the brake pressure system in proportion to the amount of fluid drained out of the pressure system through the outlet valve 13. The brake system of FIG. 6 includes the familiar elements: the brake pedal 1, the master brake pressure piston 38, the brake fluid supply container 6, the main pressure line 7, the inlet valve 12, the outlet valve 13, and the vehicle wheel 8.

A storage chamber 50 and the cylinder surrounding the refill piston 52 are connected to the main pressure line 7 through check valves 51 and 53, respectively. The refill piston 52, which is provided with a piston packing ring 52a, draws brake fluid from the supply container 6. This piston 52 is rigidly connected with a pneumatic auxiliary piston 55 by means of a piston rod 54. The piston 55 is surrounded by a pneumatic auxiliary cylinder 56 and biassed toward its normal position, which is shown in the figure, by a return spring 57. The chamber left of the auxiliary piston 55 is maintained at atmospheric pressure by an opening 58. The piston itself is provided with a cavity, herein below designated as the pressure space 59, connected via a flexible hose line 60, which terminates at the cylinder 56, to a source of pressure. Although air pressure may be most suitable for this purpose the pressure medium can be any type of gaseous or liquid fluid. The arrow P is intended to designate this pressure.

The flexible hose line 60 can be arranged in any suitable manner inside the cylinder 56. It may, for example, be wound in a spiral or in a helix around the central axis of the cylinder. In the middle of the right face of the piston 55 is an opening into the pressure space 59. This opening is closed by a valve cone 61 which is connected to and forms a twin valve element with a second valve cone 62. The valve cone 61 is held in the position shown by a spring 63.

A valve cylinder 64, the right end of which contains the storage chamber 50, is coaxially inserted in the right end wall 56a of the auxiliary cylinder 56. The storage chamber piston 65 moves within this valve cylinder. The piston 65 is joined to a so-called "valve piston" 66 forming a twin piston that is biassed toward the right toward its normal position, as shown, by a spring 67 that abuts the left end of the valve cylinder. The valve piston 66 has a passageway running through it in its axial direction. This passageway is constructed in the form of a centrally located round recess in the left face of the piston with holes 69 slanting outward from the recess to the right face of the piston. The edge 68 of this round recess acts as a valve seat for the valve cone 62. An opening 70 is finally provided to ventilate the right portion of the valve cylinder 64.

All the elements of the apparatus of FIG. 6 are illustrated in their normal or rest position. Starting from this rest position these elements cooperate to refill the pressure line 7 as follows: When the control system for preventing wheel locking acts, during the braking process, to drain brake fluid out of the brake pressure system through the outlet valve 13 into the storage chamber 50, the twin piston 65 and 66 will move toward the left against the force of the return spring 67. So long as the quantity of brake fluid drained remains small this movement of the twin piston will have no effect. When, however, the edge 68 comes in contact with the valve cone 62, the twin valve element 61 and 62 will also be moved toward the left against the force of its return spring 63. This action opens the passageway normally closed by the valve cone 61 and permits the pressure medium contained in the pressure space 59 to flow out into the right portion of the auxiliary cylinder. The consequential pressure in this chamber will induce practically no movement in the twin piston 65 and 66 because of its small diameter; it will, however, cause the twin piston 52 and 55 to move toward the left a sufficient distance to allow the valve cone 61 again to close off the pressure space 59. If more fluid flows into the storage chamber 50 the twin piston 52 and 55 will be again displaced toward the left a distance proportional to the amount of fluid inflow. As the refill piston 52 moves toward the left it forces brake fluid into the main brake pressure line 7 substituting an exactly equal amount of this fluid for the fluid drained off. When, at the end of the braking procedure, the pressure in the main brake pressure line 7 drops, the spring 67 will push the twin piston 65 and 66 toward the right to its initial position and empty the storage chamber through the check valve 51. Excess brake fluid flows back through the master brake cylinder into the supply container or into the refill cylinder. As soon as the twin piston 65 and 66 begins to move toward the right the valve cone 62 will be raised off of its seat and allow the stored pressure medium to escape from the cylinder 56 through the holes 69 and the opening 70. The return spring 57 will then move the twin piston 52 and 55 back to its initial position.

No limits need be placed on the displacements of the storage chamber and the refill cylinder; any volume reserve which may be necessary for a particular vehicle may be chosen as a matter of design.

Figure 7:
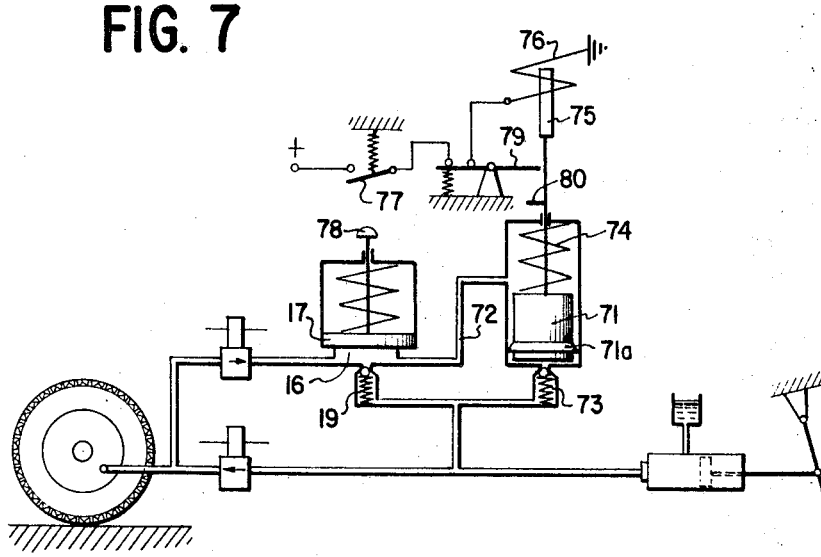
FIG. 7 is a schematic diagram of a brake system having a pedal actuated master brake pressure piston and refill apparatus, according to the present invention, with an electromagnetically driven aperiodically actuated suction pump that draws fluid from a storage chamber.

The apparatus shown in FIG. 7 employs two pistons, a storage piston 17 and a refill piston 71; these pistons are arranged in cylinders in such a way that their displacement will be approximately the same. The piston 17 has a piston rod 78 arranged to actuate a normally open electrical switch 77. The piston 71 has a piston rod which is connected to an armature 75. A tab 80 is arranged on this piston rod to actuate a normally closed electrical switch 79. The switches 77 and 79 are connected in series with a source of electrical power and a solenoid 76, which coacts with the armature 75. The storage chamber 16 is connected to the chamber above the piston 71 via a hydraulic line 72. The piston 71 is normally biassed toward its lower normal position as shown, by means of a return spring 74. The storage chamber 16 and the region below the piston 71 in the refill cylinder are connected to the brake pressure line by means of check valves 19 and 73, respectively.

The apparatus shown in FIG. 7 operates as follows: When the storage chamber has become sufficiently filled, the piston rod 78 will close the switch 77 causing the solenoid 76 to pull the armature 75 and, in turn, its refill piston 71 upward against the force of the spring 74. The piston packing ring 71a which surrounds the piston 71 is constructed so as to allow the fluid above the piston to pass to the region in the refill cylinder below the piston. As soon as the piston 71 reaches the top of its stroke the tap 80 opens the switch 79 so that current no longer flows through the solenoid 76. The spring 74 is thus allowed to push the piston 71 back to its normal position. During this actual pump stroke the contents of the storage chamber is emptied into the space in the refill cylinder above the refill piston and the contents of the refill cylinder below the refill piston forced into the main pressure line.

Figure 8:
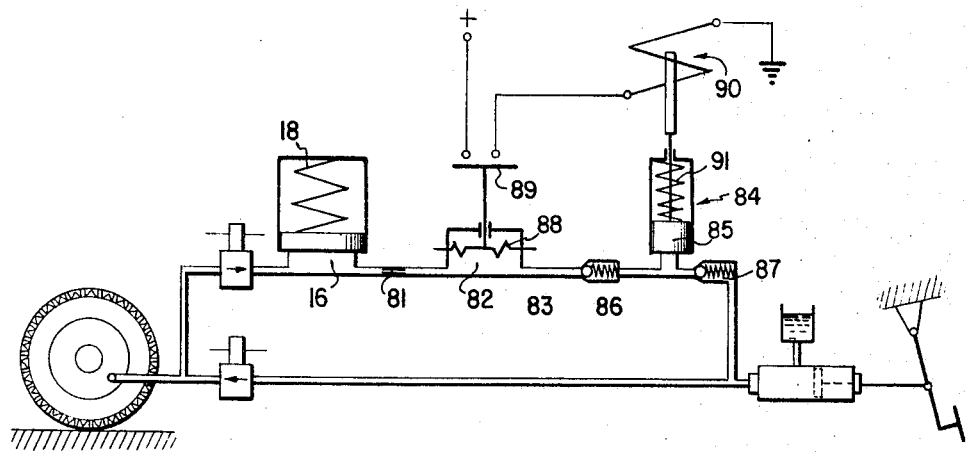
FIG. 8 is a schematic diagram of a varation of the apparatus of FIG. 7 employing a pressure actuated switch for controlling the operating cycle of the refill pump.

Another embodiment of the refill apparatus according to the present invention is illustrated in FIG. 8. This apparatus is basically a variation of the arrangement of FIG. 7. It includes a storage chamber, which is again designated with the number 16, but the piston forming the movable wall of this storage chamber is not provided with a piston, or switching, rod. The storage chamber 16 is also not directly coupled via a check valve to the main pressure line; it empties into the main pressure line, rather, through a restriction 81, a switch chamber 82, a suction line 83 and a suction pump 84. The piston 85 of the pump 84 is provided with a seal which acts, whether the piston moves up or down, to prevent fluid from entering the upper portion of the pump cylinder. The pump requires, therefore, a check valve 86 in the suction line 83. An additional check valve 87 connects the pump with the main pressure line. The switch chamber 82 has a movable wall, comprised of an elastic diaphragm 88 to which is attached a contact member 89. When the diaphragm 88 is arched upward this contact member 89 is pressed against two stationary contacts and closes the circuit to a pump actuating solenoid 90 which moves the piston 85 upward against the force of the spring 91. The displacement of the refill pump piston 85 approximately corresponds to the volume of the switch chamber 82 and is considerably smaller than the storage capacity of the storage chamber 16.

The apparatus llustrated in FIG. 8 operates as follows: When the outlet valve of the brake control system for preventing wheel locking opens the fluid flows immediately into the storage chamber 16. This fluid is subsequently forced out of the storage chamber through the restriction 81 and into the switch chamber 82 by the force of the storage chamber spring 18. A small amount of fluid may also pass through the check valve 86 into the portion of the refill cylinder below the piston 85. As long as the operative brake pressure remains on the main pressure line, however, the check valve 87 will prevent the fluid from passing into the main pressure line. The storage chamber, its spring 18 and switch chamber 82 are properly dimensioned so that the switch chamber diaphragm will arch upward and close the contact 89 whenever the storage chamber piston stands above its rest position shown in the figure. After a suction stroke of the refill pump 84, however, the switch chamber is emptied sufficiently to pull the contact 89 open and allow the pump piston to move downward under the force of the spring 91 and press the brake fluid through the check valve 87 into the main pressure line. As long as the storage chamber piston remains above its rest position the pump cycle will be repeated after a certain time which depends upon the cross section of the restriction 81. It has been proven in practice that this refilling apparatus operates satisfactorily at a refill piston frequency of about 10 to 30 Hertz. The refill pump may be made relatively small in size and, since the electrical switching device is extremely simple, may be joined together with the storage chamber, the switch chamber and the inlet and outlet valves of the brake control system into a single unit of construction.

Figure 9:
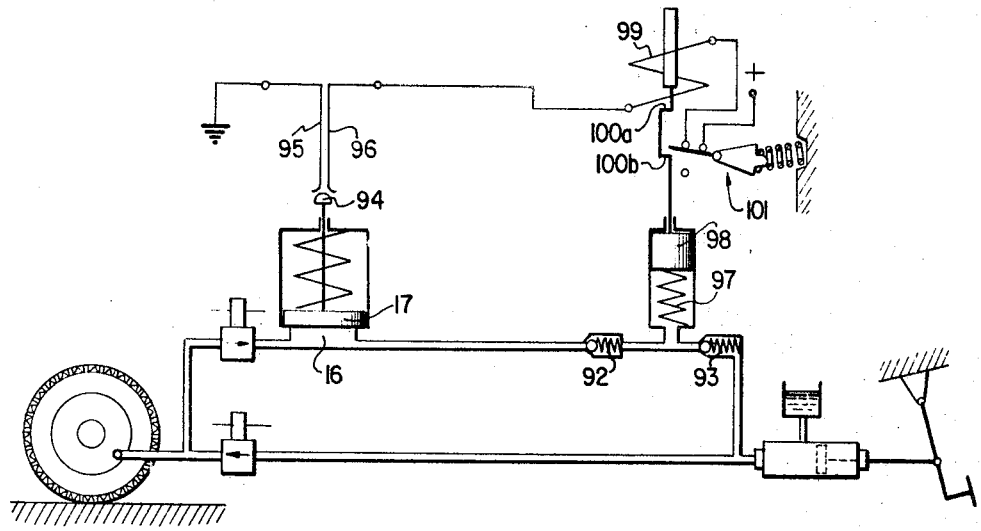
FIG. 9 is a schematic diagram of a brake system having a pedal actuated master brake pressure piston and refill apparatus, according to the present invention, having an electromagnetically periodically actuated pressure pump with a self-actuated electric circuit interrupter. The pump solenoid is in series with an electrical switch actuated by a storage chamber.

FIG. 9 illustrates still another embodiment of the apparatus according to the present invention. The storage chamber 16, can, in this case, be emptied directly through the refill pump check valve 92 and 93 into the main pressure line. The storage chamber wall or piston 17 carries a piston rod with a movable switch contact 94 in a manner similar to that shown in FIG. 7. The contact 94 is pushed between two flat springs 95 and 96 whenever the chamber 16 is partially filled. This arrangement acts as an electrical switch which closes whenever the brake fluid content of the main pressure line is less than a prescribed desired amount. The measurement of the brake fluid content in the main pressure line is thus made in terms of the amount of fluid which has flowed out of the main pressure line by the position of the storage chamber piston 17.

The refill pump is a so-called thrust or pressure pump and has a piston 98 which is moved in the drawing direction by a return spring 97 and in the pumping direction by an electromagnet. A snap or toggle switch 101 which operates in the manner described in connection with the switch 29 of FIG. 1 periodically switches the excitation winding 99 of the refill pump. The tongue of the contact of the switch is moved back and forth by two bent portions 100a and 100b of the piston rod. The blade of the switch shown in the figure lies against and electrically joins two terminal contact pins. These contact pins, the excitation winding 99 and the flat springs 95 and 96 lie in series between a source of electrical power and ground.

The apparatus shown in FIG. 9 operates as follows: When, during operation of the brake control system, an amount of brake fluid flows out of the main pressure line through the outlet valve into the storage chamber causing the brake fluid content of the main pressure line to drop below a desired value, the storage chamber contact 94 closes the electrical circuit and excites the actuating magnet of the refill pump. The piston 98 then moves downward against the force of the spring 97 and forces the quantity of fluid in the cylinder below it through the check valve 93 back into the main pressure line. Shortly before the piston reaches the end of its stroke the bent portion 100a of the piston rod comes in contact with the blade of the snap switch 101 and causes it to flip downward. As a result, the solenoid 99 will be switched off allowing the piston 98 to move upward again in the direction of the force of the spring 97. As the piston moves upward it draws brake fluid through the check valve 92 from the storage chamber 16. Shortly before the upward stroke of the piston is ended the bent portion 100b of the piston rod catches the blade of the switch 101 switching the solenoid on again. This procedure repeats itself periodically so long as the contact 94 remains between the flat springs 95 and 96.

Under certain circumstances the pump may be able to sufficiently empty the storage chamber with a single back and forth stroke of its piston causing the storage chamber piston to move back to the position illustrated. In the example of operation outlined above, however, it is assumed that so much brake fluid normally enters the storage chamber that a whole series of pump strokes will be necessary before the chamber is emptied again and the pump switched off. For a variety of reasons it is best to keep the displacement of the pump as small as possible. For a given pump displacement it is then only a question of practical experience to determine how large the storage chamber should be to prevent it from completely filling—and thus causing the control system for preventing wheel locking to become inoperative—even when the vehicle is continually braked on all possible types of road surface.

Figure 10:
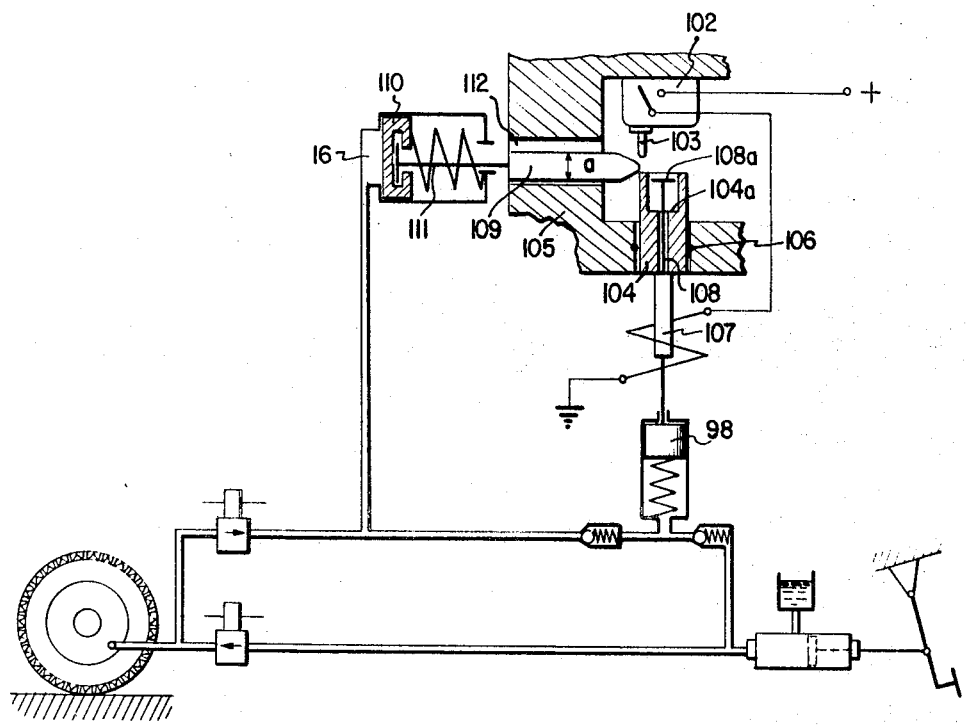
FIG. 10 is a schematic diagram of a brake system having a pedal actuated master brake pressure piston and refill apparatus, according to the present invention, which operates according to the same principles as the aparatus of FIG. 9, but which has mechanical devices for accomplishing certain electric switching functions.

The FIG. 10 illustrates another preferred embodiment of apparatus for refilling the brake presusre line, according to the present invention which operates on the same principle as the apparatus of FIG. 9. Since electrical contacts and, especially, a snap switch are especially susceptible to breakdown, the apparatus of FIG. 10 is designed with only a simple single pole, single throw switch 102 which, for example, may in practice be a common microswitch. This switch has an actuating pin 103 which must be pressed inward practically all the way before the switch will close. This actuating pin thus has a considerable dead stroke. The pin operates together with a stop face bushing 104 which is slidably arranged in a hole in a base 105 coaxially with the axis of the piston 98. A plastic ring 106 which lies in a groove in the hole in the base surrounding the stop face bushing generates a certain amount of frictional force when the bushing moves. The stop face bushing itself has a centrally located hole which becomes larger at the top forming a ring-shaped heel at the bottom. An extension to the piston rod and the armature 107 of the refill pump protrudes into the hole in the stop face bushing and terminates in a flange 108a. This extension forms an engaging rod 108 which acts to draw the stop face bushing downward after the piston 98 has moved downward a certain free distance and the flange 108a has engaged with the top surface 104a of the bushing heel. When the piston moves on its upward stroke it likewise moves first over a certain free distance until the upper edge of the armature 107 comes in contact with the stop face bushing displacing it upward to the position illustrated in the figure.

As may be seen in FIG. 10 the stop face bushing is made insufficiently long to itself make contact with the actuating pin 103. A force transfer element 109, the front edge of which is in the shape of a wedge, is provided for this purpose and arranged to be selectively inserted between the stop face bushing and the actuating pin. Except for its wedge-shaped right edge the entire length of the transfer member is given a uniform width "a." The transfer member is also provided with sufficient play within the opening 112 in the base 105 to move either up or down, to the right or to the left. If the transfer member is moved between the stop face bushing and the actuating pin so that these latter two members are separated at least by a width "a," the switch 102 will be closed when the stop face bushing is in the position illustrated; it will, however, be opened when the stop face bushing is moved downward.

The transfer member is connected by a connecting rod 111 with the piston 110 of the storage chamber 16. The storage chamber illustrated here has been rotated 90° with respect to the storage chambers illustrated in the figures previously described, so that the piston will move toward the right as the chamber is filled. The connecting rod is rigidly fastened to the left end of the transfer member and is designed with a T-shaped flange to fit into a special recess in the piston 110. The flange is free to move in a direction parallel to the piston but forced to move with the piston in the piston's axial direction.

The apparatus of FIG. 10 operates as follows: When, starting from the rest position illustrated, the storage chamber begins to fill, the transfer member will be moved toward the right. At first the transfer member will be raised up when the lower side of the wedge comes in contact with the upper left corner of the stop face bushing 104. The actuating pin 103 will next be pressed upward until the entire width "a" of the transfer member lies between the actuating pin and the stop face bushing. The stop face bushing will be prevented from moving downward during this procedure by the plastic ring 106. The actuating pin will close the switch 102 which is in series with the refill pump solenoid causing the armature 107 and, in turn, the piston 98 to move downward. In the meantime the storage chamber may continue to fill with fluid causing the transfer member to move farther toward the right. Toward the end of the stroke of the piston 98 the flange 108a will engage the stop face bushing 104 and move it downward. A return spring in the switch 102, not shown, will then press the actuating pin 103 together with the transfer member downward in the direction of the stop face bushing. As soon as the switch then opens, the return spring below the piston of the refill pump will force the piston up again, causing it, at the end of its stroke, to engage the stop face bushing and press it back into the position illustrated. This procedure will repeat itself periodically until the pump has drawn so much fluid from the storage chamber that the transfer member, drawn toward the left by the storage chamber piston 110, will no longer permit the excitation of the pump solenoid.

It will be understood that the above description of the present invention is susceptible to various modifications, changes, and adaptations, and the same are intended to be comprehended within the meaning and range of equivalents of the appended claims.

I claim:
1. Apparatus for preventing loss of braking force in a hydraulic, piston actuated brake system having a brake control system for preventing wheel locking which temporarily reduces the braking force by drawing brake fluid from the brake fluid pressure system comprising, in combination:
   (a) means for sensing the amount of brake fluid in said pressure system; and
   (b) means responsive to said sensing means for automatically refilling brake fluid in said pressure system in dependence upon said amount.

2. The apparatus defined in claim 1,
   wherein said brake system includes a pneumatic brake force booster having a cylinder divided into two chambers by a piston and two booster cylinder lines connecting said chambers to sources of different pressure;
   wherein said brake control system includes individually controlled inlet and outlet valves for passing brake fluid into and out of at least one wheel brake cylinder, respectively;
   wherein said sensing means includes a storage chamber connected to feed into said brake pressure system through a one-way check valve and connected to said outlet valve to receive and temporarily store said brake fluid drawn from said pressure system, said chamber having a movable wall which is spring biassed in the direction of minimum chamber size; and
   wherein said refilling means includes means for connecting said booster cylinder lines to opposite ones of said sources of pressure and means for simultaneously closing said inlet valve in dependence upon the amount of fluid in said storage chamber.

3. The apparatus defined in claim 1,
   wherein said sensing means includes brake element means which moves in response to the amount of brake fluid in said pressure system, and
   wherein said refilling means includes at least one auxiliary pressure valve having valve control rod means operable to move between two end positions and snap-action means responsive to the position of said brake element means for actuating said rod means such that said rod means is moved into one of said end positions when said amount of fluid falls below a prescribed minimum amount and into the other of said end positions when said amount of fluid exceeds a prescribed desired amount.

4. The apparatus defined in claim 2,
   wherein said inlet valve is an electrically actuated valve;
   wherein said means for connecting said booster cylinder lines to opposite ones of said sources of pressure includes two synchronously actuated three-way valves having valve control rod means operable to move between two end positions and snap-action means responsive to said movable wall for actuating said rod means such that said rod means is moved into one of said end positions when said amount of fluid falls below a prescribed minimum amount and into the other of said end positions when said amount of fluid exceeds a prescribed desired amount; and
   wherein said means for simultaneously closing said inlet valve is a pressure difference switch pneumatically connected between said booster cylinder lines and electrically connected to close said inlet valve when said rod means is in said one position.

5. The apparatus defined in claim 1,
   wherein said sensing means includes brake element means which moves in response to the amount of brake fluid in said pressure system, and
   wherein said refilling means includes electrical snap switch means responsive to the position of said brake element means and operative to switch into one position when said amount of fluid falls below a prescribed minimum amount and into another position when said amount of fluid exceeds a prescribed desired amount.

6. The apparatus defined in claim 2,
   wherein said inlet valve is an electrically actuated valve;
   wherein said means for connecting said booster cylinder lines to opposite ones of said sources of pressure includes two synchronously and electrically actuated three-way valves and snap switch means responsive to the position of said movable wall for actuating said two three-way valves and said inlet valve together so as to close said inlet valve when said three-way valves are actuated so as to refill said pressure system.

7. The apparatus defined in claim 1,
   wherein said sensing means includes brake element means which moves in response to the amount of brake fluid in said pressure system, and
   wherein said refilling means includes electrical switch means responsive to the position of said brake element means and operative to switch on whenever said amount of fluid is below a prescribed desired amount.

8. The apparatus defined in claim 1,
   wherein said brake system includes a brake fluid supply container, and
   wherein said refilling means includes refill pump means for drawing brake fluid from said supply container and inserting it into said pressure system.

9. The apparatus defined in claim 1,
   wherein said sensing means includes a storage chamber connected to receive and temporarily store said brake fluid which is drawn from said pressure system, said chamber having a movable wall which is biassed in the direction of minimum chamber size, and
   wherein said refilling means includes refill pump means for drawing brake fluid from said chamber and inserting it into said pressure system.

10. The apparatus defined in claim 8, wherein said refill pump means includes electrically controllable quick-starting pump drive means.

11. The apparatus defined in claim 8, wherein said refill pump means includes electrically controllable quick-coupling pump drive means.

12. The apparatus defined in claim 9, wherein said refill pump means includes electrically controllable quick-starting pump drive means.

13. The apparatus defined in claim 9, wherein said refill pump means includes electrically controllable quick-coupling pump drive means.

14. The apparatus defined in claim 8, wherein said refill pump means includes pump drive means for continuously driving said pump means at least when said braking force is applied in said brake system and electromagnetically actuated shutoff valve means arranged in the outlet of said pump means for selectively preventing the insertion of said brake fluid into said pressure system.

15. The apparatus defined in claim 9, wherein said refill pump means includes pump drive means for continuously driving said pump means at least when said braking force is applied in said brake system and electromagnetically actuated shutoff valve means arranged in the outlet of said pump means for selectively preventing the insertion of said brake fluid into said pressure system.

16. The apparatus defined in claim 8,
   wherein said brake system includes master brake piston means for producing a brake pressure in dependence upon it position;
   wherein said sensing means includes brake element means which moves in response to the position of said piston means;

wherein said refilling means includes electrical switch means responsive to the position of said brake element means and operative, when switched on, to remain on so long as said amount of fluid remains below a prescribed desired amount; and wherein said refill pump means is electrically controllable and electrically connected to said switch means, thereby to operate when said switch means is switched on.

17. The apparatus defined in claim 9,
wherein said sensing means includes a storage chamber connected to receive the brake fluid which is drawn from said pressure system, said chamber having a movable wall which is biassed in the direction of minimum chamber size;
wherein said refilling means includes electrical switch means responsive to the position of said movable wall and operative, when switched on, to remain on so long as said amount of fluid remains below a prescribed desired amount; and
wherein said refill pump means is electrically controllable and electrically connected to said switch means, thereby to operate when said switch means is switched on.

18. The apparatus defined in claim 17, wherein said sensing means further includes check-valve means arranged in parallel with said refill pump means to interconnect said storage chamber and said pressure system, thereby to allow the brake fluid in said storage chamber to empty directly into said pressure system when the braking force is removed in said brake system.

19. The apparatus defined in claim 14, wherein said brake control system includes an outlet valve arranged to selectively draw brake fluid from said pressure system and wherein said shut-off valve means is electrically connected to operate in synchronism with said outlet valve, thereby to open when said outlet valve opens and to close when said outlet valve closes.

20. The apparatus defined in claim 15, wherein said brake control system includes an outlet valve arranged to selectively draw brake fluid from said pressure system and wherein said shut-off valve means is electrically connected to operate in synchronism with said outlet valve, thereby to open when said outlet valve opens and to close when said outlet valve closes.

21. The apparatus defined in claim 1, wherein said refilling means includes aperiodically operating refill pump means having a refill pump piston.

22. The apparatus defined in claim 21, wherein said refilling means further includes pump drive means having a drive piston rigidly coupled to said pump piston and arranged to move inside a drive cylinder, a source of pressure medium and pressure medium valve means, responsive to said sensing means, for controlling the amount of pressure medium entering said drive cylinder.

23. The apparatus defined in claim 22,
wherein said sensing means includes a storage chamber connected to receive and temporarily store said brake fluid which is drawn from said pressure system, said chamber having a movable wall which is biassed in the direction of minimum chamber size; and
wherein said pressure medium valve means is responsive to the position of said movable wall so that the amount of fluid pumped by said refill pump piston will be approximately proportional to the amount of fluid in said storage chamber.

24. The apparatus defined in claim 23,
wherein said drive piston contains a pressure space;
wherein said source of pressure medium is connected to said pressure space by a flexible pressure medium line which passes through said drive cylinder; and
wherein said pressure medium valve means includes, in combination:

(1) twin valve element means having two interconnected valve elements, one of which is operative to open and close said pressure space;
(2) spring bias means for holding said twin valve element means such that said one valve element normally closes said pressure space;
(3) a valve cylinder arranged at one end of said drive cylinder closing said one end of said drive cylinder; and
(4) valve piston means connected to said movable wall of said storage chamber and arranged to move inside said valve cylinder in response to the movement of said movable wall, said valve piston means providing valve seat means for the other of said interconnected valve elements which, when abutting said other valve element, is operative to push said twin valve element against the force of said spring bias to open said one valve element and operative to close off said one end of said drive cylinder, thereby to allow said pressure medium to accumulate in said one end of said cylinder.

25. The apparatus defined in claim 22, wherein said pressure medium comprises: air at pressure below atmospheric pressure, air at pressure above atmospheric pressure, lubricating oil at pressure above atmospheric pressure or hydraulic oil at pressure above atmospheric pressure.

26. The apparatus defined in claim 22, wherein said source of pressure medium comprises: a vehicle motor air intake, an air compressor, a vehicle motor lubricating oil pressure pump or a vehicle hydraulic pump.

27. The apparatus defined in claim 26, wherein said vehicle hydraulic pump is a power steering hydraulic pump.

28. The apparatus defined in claim 1, wherein said refilling means includes an electrically actuated piston-type suction refill pump for inserting brake fluid into said pressure system, said refill pump comprising, in combination:

(1) a cylinder;
(2) piston means arranged to move within said cylinder for drawing brake fluid into said cylinder and forcing brake fluid in said cylinder into said pressure system;
(3) spring bias means for causing said piston means to move inside said cylinder in a first direction in which direction said piston means forces said fluid into said pressure system; and
(4) electromagnetically actuated means for causing said piston means to move inside said cylinder in the direction opposite to said first direction.

29. The apparatus defined in claim 28, wherein said brake system includes a brake fluid supply container and said refilling means includes means connecting said refill pump to said supply container, whereby said refill pump draws brake fluid from said supply container.

30. The apparatus defined in claim 28,
wherein said sensing means includes a storage chamber connected to receive and temporarily store said brake fluid which is drawn from said pressure system, said chamber having a movable wall which is biassed in the direction of minimum chamber size; and
wherein said refilling means includes means connecting said refill pump to said storage chamber whereby said refill pump draws brake fluid from said storage chamber.

31. The apparatus defined in claim 30, wherein said refilling means further includes:
(1) first limit switch means arranged to be actuated by said movable chamber wall when said storage chamber is approximately full;
(2) second limit switch means arranged to be actuated by said refill pump piston means when said piston means is drawn approximately to the end of its stroke in said opposite direction; and (3) electric circuit means for actuating said refill pump electromagnetically actuated means when said first limit switch is actuated and for deactuating said refill pump electromagnetically actuated means when said second limit switch is actuated.

32. The apparatus defined in claim 30, wherein said means connecting said refill pump to said storage chamber includes switch chamber means connected to receive said brake fluid drawn from said storage chamber by said refill pump before said brake fluid reaches said refill pump, said switch chamber means having a movable wall which is biassed in the direction of minimum chamber size and electrical switch means mechanically connected to said movable wall of said switch chamber means to close when said switch chamber means contains a certain amount of brake fluid and electrically connected to actuate, when closed, said refill pump electromagnetically actuated means.

33. The apparatus defined in claim 32, wherein said means connecting said refill pump to said storage chamber includes means for restricting the flow of brake fluid between said storage chamber and said switch chamber.

34. The apparatus defined in claim 33,
wherein the area of and bias force against said movable walls of said storage chamber and said switch chamber means, respectively, are such that the pressure generated by said wall of said storage chamber is sufficient to move said wall of said switch chamber means in the direction of increasing switch chamber size against the force of its bias, and
wherein the displacement of said wall of said switch chamber means at the point at which it closes said electrical switch means is a fraction of the maximum displacement of said wall of said storage chamber and approximately the same as the maximum displacement of said refill pump means.

35. The apparatus defined in claim 1, wherein said refilling means includes an electrically actuated pressure-type refill pump for inserting brake fluid into said pressure system, said refill pump comprising, in combination:
(1) a cylinder;
(2) piston means arranged to move within said cylinder for drawing brake fluid into said cylinder and forcing brake fluid in said cylinder into said pressure system;
(3) electromagnetically actuated drive means for causing said piston means to move inside said cylinder in a first direction in which said piston means forces said fluid into said pressure system;
(4) spring bias means for causing said piston means to move in a direction opposite to said first direction when said, drive means is not actuated; and
(5) electric control means connected to said sensing means and to said piston means, for actuating said drive means when said piston means is moved near the end of its stroke in said opposite direction and deactuating said drive means when said piston means is moved near the end of its stroke in said first direction when said amount of brake fluid falls below a prescribed minimum level until said amount reaches a prescribed desired level.

36. The apparatus defined in claim 35, wherein said electric control means includes:
(i) a normally open single-pole, single-throw electric switch having an actuating pin;
(ii) an actuating member arranged near said actuating pin and connected to said piston means such that said actuating member will be drawn away from said actuating pin when said piston means is moved near the end of its stroke in said first direction and moved toward said actuating pin when said piston means is moved near the end of its stroke in said opposite direction; and
(iii) a transfer member connected to said sensing means and arranged to be moved thereby between said actuating pin and said actuating member so as to selectively close said electric switch in dependence upon said amount of brake fluid in said pressure system when said actuating member is moved toward said actuating pin.

References Cited

UNITED STATES PATENTS

| | | | |
|---|---|---|---|
| 2,475,701 | 7/1949 | Eaton | 303—58 X |
| 2,656,017 | 10/1953 | Trevaskis. | |
| 2,973,994 | 3/1961 | Wells | 303—59 X |
| 3,276,822 | 10/1966 | Lister et al. | |

DUANE A. REGER, Primary Examiner

U.S. Cl. X.R.

303—10, 58